(12) United States Patent
Okuno et al.

(10) Patent No.: US 12,044,308 B2
(45) Date of Patent: Jul. 23, 2024

(54) CONTROL DEVICE FOR VEHICLE, CONTROL METHOD FOR VEHICLE, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Koichi Okuno, Kawasaki (JP); Keisuke Iwado, Ebina (JP); Makoto Oguri, Ayase (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/548,259

(22) PCT Filed: Feb. 16, 2022

(86) PCT No.: PCT/JP2022/006248
§ 371 (c)(1),
(2) Date: Aug. 29, 2023

(87) PCT Pub. No.: WO2022/185925
PCT Pub. Date: Sep. 9, 2022

(65) Prior Publication Data
US 2024/0133463 A1    Apr. 25, 2024

(30) Foreign Application Priority Data
Mar. 5, 2021 (JP) .................................. 2021-035860

(51) Int. Cl.
*B60W 10/30* (2006.01)
*B60W 10/06* (2006.01)
(Continued)

(52) U.S. Cl.
CPC ......... *F16H 61/0262* (2013.01); *B60W 10/06* (2013.01); *B60W 10/30* (2013.01);
(Continued)

(58) Field of Classification Search
CPC .................. F16H 61/0262; F16H 59/74; F16H 2059/746; B60W 10/06; B60W 10/30;
(Continued)

(56) References Cited

U.S. PATENT DOCUMENTS 6,390,947 B1 *  5/2002  Aoki ..................... B60W 10/06
                                                    477/3
8,825,347 B2 *  9/2014  Yamada ............ F16H 61/66272
                                                    701/112
(Continued)

FOREIGN PATENT DOCUMENTS

JP        2010-117032 A       5/2010

*Primary Examiner* — Roger L Pang
(74) *Attorney, Agent, or Firm* — Foley & Lardner LLP

(57) ABSTRACT

Provided is a control device for a vehicle including a first oil pump that is driven by a first drive source driving a drive wheel of a vehicle and configured to supply oil to a hydraulic pressure actuation machine, and a second oil pump that is driven by a second drive source different from the first drive source and configured to supply oil to the hydraulic pressure actuation machine. The control device drives the second oil pump when a start switch of the vehicle is turned on and the first drive source is started for the first time, and drives the second oil pump when the second oil pump is not driven for a first predetermined time after the first drive source is started, and a rotation speed of the second oil pump when the first drive source is started is lower than a rotation speed of the second oil pump after the first drive source is started.

7 Claims, 5 Drawing Sheets

(51) Int. Cl.
*F15B 15/18* (2006.01)
*F16H 59/74* (2006.01)
*F16H 61/02* (2006.01)

(52) U.S. Cl.
CPC ............. *F15B 15/18* (2013.01); *F16H 59/74* (2013.01); *F16H 2059/746* (2013.01)

(58) Field of Classification Search
CPC ......... B60W 2510/06; B60W 2710/30; B60W 30/18018; B60W 30/18027
USPC ..................................................... 701/53, 66
See application file for complete search history.

(56) References Cited

U.S. PATENT DOCUMENTS

| | | | | |
|---|---|---|---|---|
| 2013/0138311 A1* | 5/2013 | Kang | .................... | B60W 10/11 903/902 |
| 2014/0297138 A1* | 10/2014 | Hwang | ............... | F16H 61/0025 701/53 |
| 2018/0094722 A1* | 4/2018 | Katakura | ................ | F16H 59/14 |

* cited by examiner

CONTROL DEVICE FOR VEHICLE, CONTROL METHOD FOR VEHICLE, AND NON-TRANSITORY COMPUTER-READABLE MEDIUM

TECHNICAL FIELD

The present invention relates to a control device for a vehicle, a control method for a vehicle, and a program.

BACKGROUND ART

Patent Document 1 discloses a control device for an automatic transmission for a vehicle in which, after an ignition switch is turned off, an electric oil pump supplies a hydraulic pressure to a first brake of the automatic transmission to engage the first brake, thereby discharging air mixed in an oil passage of the first brake.

PRIOR ART DOCUMENT

Patent Document

Patent Document 1: JP 2010-117032 A

SUMMARY OF INVENTION

However, in the control device of Patent Document 1, even when air release is executed after the ignition switch is turned off, if there is a delay before the ignition switch is turned on next time, air may be mixed in the oil passage and the responsiveness may be reduced.

The inventors of the present invention found that if air is mixed in the oil passage when the ignition switch (start switch) of the vehicle is turned on and the electric oil pump starts to operate for the first time, a suction sound is generated and a driver may feel uncomfortable.

The present invention has been made in view of the above problems, and an object of the present invention is to suppress the suction sound of the oil pump and prevent the driver from feeling uncomfortable.

According to one aspect of the present invention, a control device for a vehicle including a first oil pump that is driven by a first drive source driving a drive wheel of a vehicle and configured to supply oil to a hydraulic pressure actuation machine, and a second oil pump that is driven by a second drive source different from the first drive source and configured to supply oil to the hydraulic pressure actuation machine, wherein the second oil pump is driven when a start switch of the vehicle is turned on and the first drive source is started for the first time, and the second oil pump is driven when the second oil pump is not driven for a first predetermined time after the first drive source is started, and a rotation speed of the second oil pump when the first drive source is started is lower than a rotation speed of the second oil pump after the first drive source is started.

In the above aspect, since the second oil pump is driven when the start switch of the vehicle is turned on and the first drive source is started for the first time, it is possible to bleed air out of an oil passage. Since the rotation speed of the second oil pump when the first drive source is started is lower than the rotation speed of the second oil pump after the first drive source is started, the suction sound can be reduced. Therefore, it is possible to suppress the suction sound of the second oil pump and prevent the driver from feeling uncomfortable.

DESCRIPTION OF EMBODIMENTS

Hereinafter, an embodiment of the present invention will be described with reference to the accompanying drawings.

Figure 1:
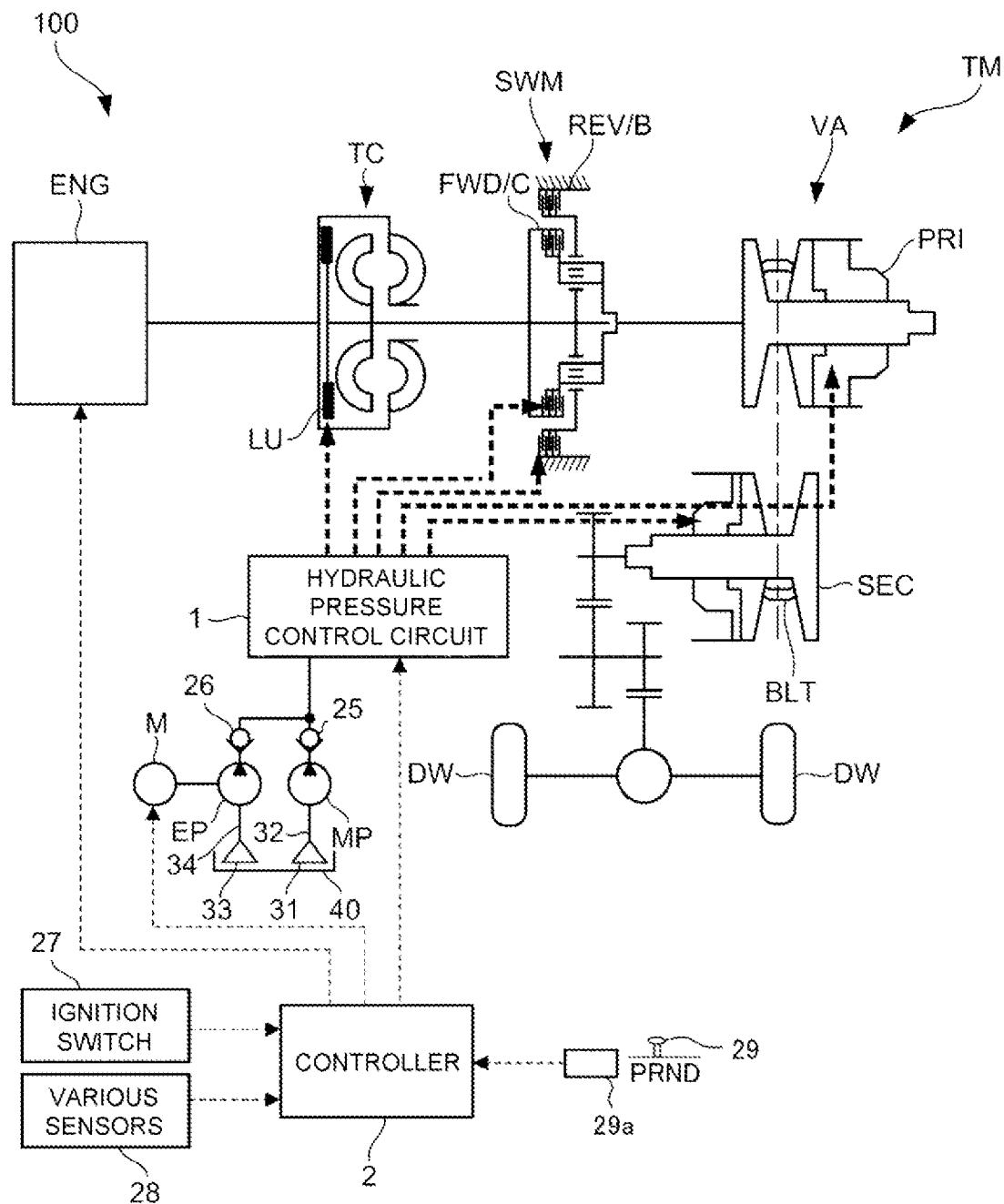
FIG. 1 is a schematic configuration diagram of a vehicle to which a control device according to an embodiment of the present invention is applied.

First, a vehicle 100 to which a control device according to the present embodiment is applied will be described with reference to FIG. 1. FIG. 1 is a schematic configuration diagram of the vehicle 100.

As shown in FIG. 1, the vehicle 100 includes an engine ENG, a transmission TM as a hydraulic pressure actuation machine that is hydraulically actuated, and a controller 2 as the control device. The transmission TM is a belt continuously variable transmission including a torque converter TC, a forward/reverse switching mechanism SWM, and a variator VA.

The engine ENG constitutes a first drive source that drives drive wheels DW of the vehicle 100. The engine ENG is, for example, a gasoline engine or a diesel engine. The power of the engine ENG is transmitted to the drive wheels DW via the torque converter TC, the forward/reverse switching mechanism SWM, and the variator VA. In other words, the torque converter TC, the forward/reverse switching mechanism SWM, and the variator VA are provided in a power transmission path connecting the engine ENG and the drive wheels DW.

The torque converter TC transmits power through a fluid. In the torque converter TC, the power transmission efficiency is enhanced by engaging a lock-up clutch LU.

The forward/reverse switching mechanism SWM is provided in a power transmission path connecting the engine ENG and the variator VA. The forward/reverse switching mechanism SWM switches forward/reverse of the vehicle 100 by switching a rotation direction of input rotation. The forward/reverse switching mechanism SWM includes a forward clutch FWD/C that is engaged when a forward range is selected and a reverse brake REV/B that is engaged when a reverse range is selected. When the forward clutch FWD/C and the reverse brake REV/B are disengaged, the transmission TM is in a neutral state, that is, a power cutoff state.

The variator VA constitutes a belt continuously variable transmission mechanism including a primary pulley PRI, a secondary pulley SEC, and a belt BLT wound around the primary pulley PRI and the secondary pulley SEC. A primary pulley pressure, which is a hydraulic pressure of the primary pulley PRI, is supplied to the primary pulley PRI from a hydraulic pressure control circuit 1 to be described later, and a secondary pulley pressure, which is a hydraulic pressure of the secondary pulley SEC, is supplied to the secondary pulley SEC from the hydraulic pressure control circuit 1.

The transmission TM further includes a mechanical oil pump MP as a first oil pump, an electric oil pump EP as a second oil pump, and an electric motor M as a second drive source different from the first drive source.

The mechanical oil pump MP is driven by the power of the engine ENG. The mechanical oil pump MP suctions hydraulic oil from a reservoir (oil pan) 40 via a strainer 31 and an oil passage 32, and pressure-feeds (supplies) the oil to the transmission TM via the hydraulic pressure control circuit 1. A check valve 25 is provided in a flow path through which the mechanical oil pump MP and the hydraulic pressure control circuit 1 communicate with each other.

The electric oil pump EP is driven by the power of the electric motor M. The electric oil pump EP is driven together with or independently of the mechanical oil pump MP, suctions up hydraulic oil from the reservoir 40 via the strainer 33 and the oil passage 34, and pressure-feeds (supplies) the oil to the transmission TM via the hydraulic pressure control circuit 1. A check valve 26 is provided in a flow path through which the electric oil pump EP and the hydraulic pressure control circuit 1 communicate with each other. The electric oil pump EP is auxiliary to the mechanical oil pump MP. That is, when the supply of oil from the mechanical oil pump MP to the transmission TM is stopped or insufficient, the electric oil pump EP temporarily supplies oil to the transmission TM based on a drive request so as to compensate for the shortage of oil. It may be understood that the electric oil pump EP includes the electric motor M.

The transmission TM further includes the hydraulic pressure control circuit 1. The hydraulic pressure control circuit 1 includes a plurality of flow paths and a plurality of hydraulic pressure control valves, regulates the pressure of the oil supplied from the mechanical oil pump MP and the electric oil pump EP, and supplies the oil to each part of the transmission TM.

The hydraulic pressure control circuit 1 performs hydraulic pressure control of the lock-up clutch LU, the forward clutch FWD/C, the reverse brake REV/B, the primary pulley PRI, the secondary pulley SEC, and the like based on commands from the controller 2.

The controller 2 is implemented by a microcomputer including a central processing unit (CPU), a read-only memory (ROM), a random access memory (RAM), and an input/output interface (I/O interface). The controller 2 performs various processes by reading and executing programs stored in the ROM by the CPU. The controller 2 may also be implemented by a plurality of microcomputers. Specifically, the controller 2 may also include an ATCU that controls the transmission TM, an SCU that controls a shift range, an ECU that controls the engine ENG, and the like.

The controller 2 performs hydraulic pressure control of the engine ENG, the hydraulic pressure control circuit 1, the electric motor M that drives the electric oil pump EP, and the like based on signals output from an ignition switch 27, various sensors 28 (specifically, an accelerator position (accelerator opening degree) sensor, a rotation speed sensor, a vehicle speed sensor, and a hydraulic pressure sensor) that detect a state of each part of the vehicle 100, and an inhibitor switch 29a that detects a position of a shift selector 29.

Incidentally, in the vehicle 100, the mechanical oil pump MP and the electric oil pump EP do not operate when the ignition switch 27 is turned off. Therefore, for example, when the vehicle 100 is parked in a parking lot at home for a long time, the oil leaks out from the oil passage or the like in the transmission TM.

Here, since the engine ENG is operated when the vehicle 100 is driven, the mechanical oil pump MP is driven by the engine ENG, and each part is filled with oil. However, as described above, since the check valve 26 is provided between the electric oil pump EP and the hydraulic pressure control circuit 1, an oil passage closer to the electric oil pump EP than the check valve 26 is not filled with oil. Therefore, when there is a request to drive the electric oil pump EP, a delay may occur in the supply of oil from the electric oil pump EP to the hydraulic pressure control circuit 1.

Even when the vehicle 100 is traveling, if the electric oil pump EP continues to be in a non-driven state, the oil leaks out from the oil passage closer to the electric oil pump EP than the check valve 26.

Further, the inventors of the present invention found that if air is mixed in the oil passage when the ignition switch 27 of the vehicle 100 is turned on and the electric oil pump EP starts to operate for the first time, a suction sound is generated and a driver may feel uncomfortable.

Therefore, when the ignition switch 27 of the vehicle 100 is turned on and the engine ENG is started for the first time and when the electric oil pump EP is not driven for a first predetermined time (predetermined time Tb) after the engine ENG is started, the controller 2 drives the electric oil pump EP as described below, and executes an air bleeding process in which the oil passage (oil passage closer to an upstream side than the check valve 26) closer to the electric oil pump EP than the check valve 26 is filled with oil.

When idle stop is executed and the engine ENG is restarted, the traveling is often started immediately after the engine ENG is started. Therefore, when the idle stop is executed and the engine ENG is restarted, the same air bleeding process of the electric oil pump EP as when the ignition switch 27 is turned on and the engine ENG is started for the first time is not performed. That is, in the present embodiment, "when the engine ENG is started" means that the engine ENG is started for the first time after the ignition switch 27 of the vehicle 100 is turned on, and the execution of the idle stop and restarting the engine ENG is not included in "when the engine ENG is started".

Next, a first operation control of the electric oil pump EP when the ignition switch 27 is turned on will be described with reference to FIG. 2.

Figure 2:
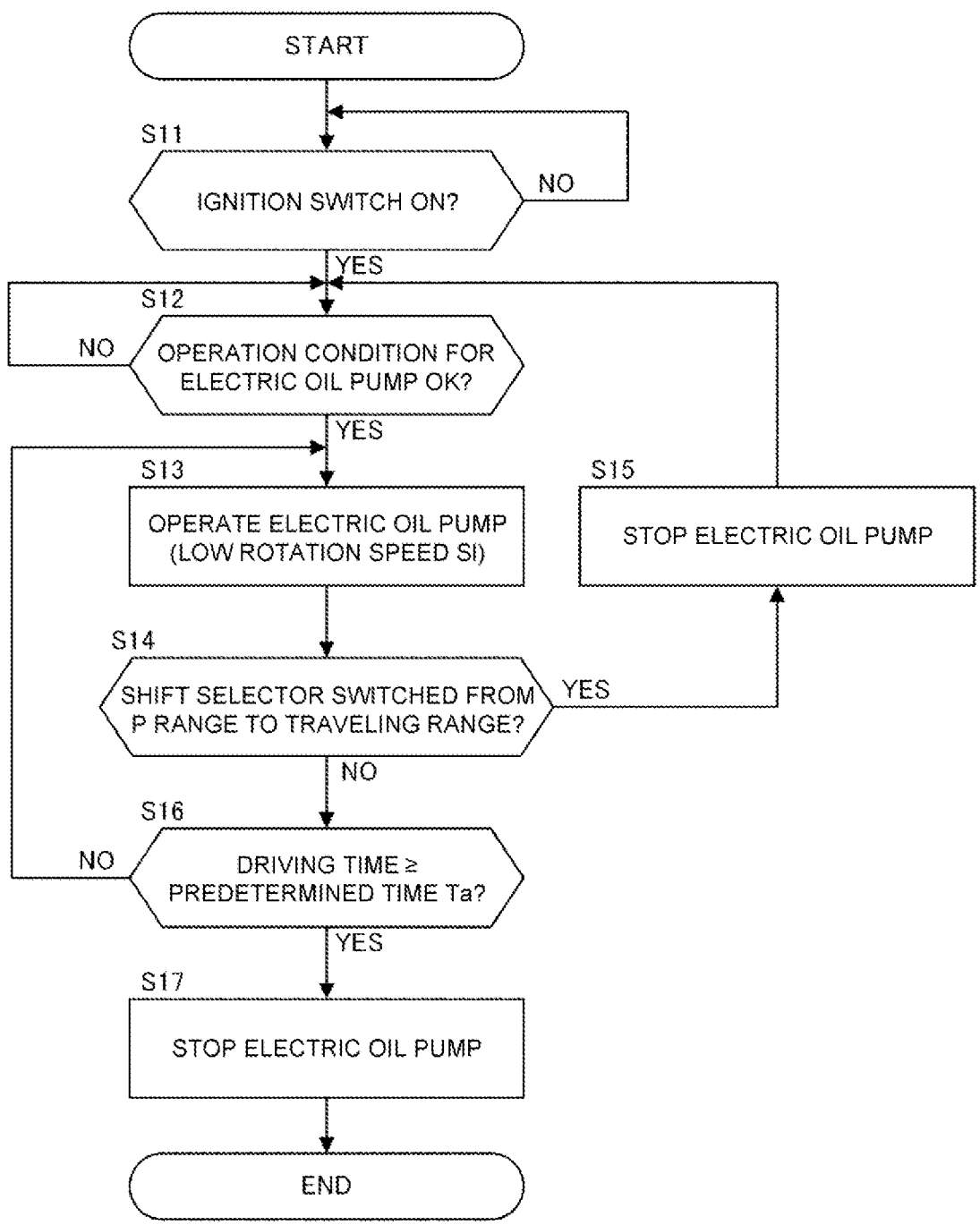
FIG. 2 is a flow chart of an air bleeding process of a second oil pump when a start switch of the vehicle is turned on and a first drive source is started for the first time.

FIG. 2 is a flow chart of the air bleeding process of the electric oil pump EP when the ignition switch 27 is turned on and the engine ENG is started for the first time. The air bleeding process of the electric oil pump EP of the present embodiment is executed based on a program stored in the controller 2 in advance. The flow of FIG. 2 is started when the shift selector 29 of the vehicle 100 is in a P range.

In step S11, the controller 2 determines whether the ignition switch 27 is changed from off to on based on an output signal output from the ignition switch 27. When the controller 2 determines in step S11 that the ignition switch 27 is turned on, the process proceeds to step S12. When the ignition switch 27 is turned on, the engine ENG is started, and the mechanical oil pump MP starts to discharge oil. On the other hand, when the controller 2 determines in step S11 that the ignition switch 27 is not turned on, that is, remains off, the determination of step S11 is repeated.

In step S12, the controller 2 determines whether an operation condition for operating the electric oil pump EP is satisfied. Here, the operation condition includes at least that when the engine ENG is started and the mechanical oil pump MP starts to discharge oil, a rate of increase in a discharge pressure is temporarily increased and then the discharge pressure is stabilized. When the controller 2 determines in step S12 that the operation condition of the electric oil pump EP is satisfied, the process proceeds to step S13. On the other hand, when the controller 2 determines in step S12 that the operation condition of the electric oil pump EP is not satisfied, the determination of step S12 is repeated.

In step S13, the controller 2 operates the electric oil pump EP at a low rotation speed S1 lower than a normal rotation speed Sn. The normal rotation speed Sn is a rotation speed of the electric oil pump EP after the engine ENG is started, as will be described later. In contrast, the low rotation speed S1 is lower than the normal rotation speed Sn. Here, the normal rotation speed Sn is, for example, about 1500 [rpm] to 2000 [rpm], and the low rotation speed S1 is, for example, about 500 [rpm] to 1000 [rpm].

When the vehicle 100 is braked suddenly or kick-down is executed, a speed ratio is shifted (downshifted) from a current speed ratio to a speed ratio on a low side (larger speed ratio side). As described above, when the vehicle 100 is braked suddenly or kick-down is executed, a high shift speed is required, and thus a required flow rate of oil increases. Therefore, the rotation speed of the electric oil pump EP when the vehicle 100 is braked suddenly is about 2000 [rpm] to 3000 [rpm], which is higher than the normal rotation speed Sn, and the rotation speed of the electric oil pump EP when kick-down is executed is also about 2000 [rpm] to 3000 [rpm], which is higher than the normal rotation speed Sn.

In step S14, the controller 2 determines whether the shift selector 29 is switched from the P range to a traveling range. The P range is a parking range in which a parking lock mechanism (not shown) locks the transmission TM, and the traveling range includes a D range (forward range) and an R range (reverse range) and is a range in which the transmission TM can transmit power from the engine ENG to drive the drive wheels DW. When the controller 2 determines in step S14 that the shift selector 29 is not switched from the P range to the traveling range, the process proceeds to step S16. The controller 2 determines that the shift selector 29 is not switched from the P range to the traveling range not only when the shift selector 29 is not switched but remains in the P range but also when the shift selector 29 is not switched but remains in the D range or the R range. On the other hand, when the controller 2 determines in step S14 that the shift selector 29 is switched from the P range to the traveling range, the process proceeds to step S15.

In step S15, since the shift selector 29 is switched and the oil is supplied to engage the forward clutch FWD/C or the reverse brake REV/B of the forward/reverse switching mechanism SWM, the controller 2 stops the operation of the electric oil pump EP to interrupt the air bleeding process. At this time, since the operation of the electric oil pump EP is stopped due to the shift selector 29 being switched from the P range to the traveling range, the air bleeding process of the electric oil pump EP is not completed. Therefore, returning to step S12, the controller 2 determines again whether the operation condition of the electric oil pump EP is satisfied. As a result, when the operation condition of the electric oil pump EP is satisfied, the air bleeding process of the electric oil pump EP is executed again.

The operation condition for executing the air bleeding process of the electric oil pump EP again includes that the shift selector 29 is switched and a selecting process is completed, that an oil temperature of the transmission TM is within a threshold, that no failure of the electric oil pump EP is detected, and that the electric oil pump EP is not in an inoperable state from the viewpoint of protecting the electric oil pump EP.

In step S16, the controller 2 determines whether the driving time of the electric oil pump EP has reached a predetermined time Ta. The predetermined time Ta is the time during which the electric oil pump EP is operated at the low rotation speed S1 to perform the air bleeding process. The predetermined time Ta is set to the time until the number of rotations of the electric oil pump EP reaches a predetermined number of rotations Np. The predetermined number of rotations Np is the number of rotations for filling the oil passage closer to the electric oil pump EP than the check valve 26 with oil. Specifically, the predetermined number of rotations Np is set in advance such that the hydraulic oil is filled in a space above an oil surface in the strainer 33 that suctions up the hydraulic oil from the oil passage 34 upstream of the electric oil pump EP and from the reservoir 40. Here, the predetermined number of rotations Np is about 30 [rotations] to 35 [rotations]. The predetermined time Ta is longer than a predetermined time Tc for performing the air bleeding process of the electric oil pump EP at the normal rotation speed Sn after the engine ENG is started, which will be described later. Here, the predetermined time Ta is about 2.0 [sec] to 3.0 [sec], and the predetermined time Tc is about 1.0 [sec]. When the controller 2 determines in step S16 that the driving time of the electric oil pump EP has reached the predetermined time Ta, the process proceeds to step S17. On the other hand, when the controller 2 determines in step S16 that the driving time of the electric oil pump EP has not reached the predetermined time Ta, the process returns to step S13, and the air bleeding process of the electric oil pump EP is continued.

As described above, the driving time (predetermined time Ta) of the electric oil pump EP when the engine ENG is started is longer than the driving time (predetermined time Tc) of the electric oil pump EP after the engine ENG is started. As a result, it is possible to prevent a decrease in the amount of discharged air even when the rotation speed of the electric oil pump EP at the time of starting is low, and thus it is possible to prevent deterioration in the responsiveness of the transmission TM during traveling due to the influence of air.

In step S17, the controller 2 stops the operation of the electric oil pump EP. As a result, the air bleeding process of the electric oil pump EP is completed.

As described above, since the electric oil pump EP is driven when the ignition switch 27 of the vehicle 100 is turned on and the engine ENG is started for the first time, it is possible to bleed air out of the oil passage. Since the rotation speed of the electric oil pump EP when the engine ENG is started is lower than the rotation speed of the electric oil pump EP after the engine ENG is started, the suction sound can be reduced. Therefore, it is possible to suppress the suction sound of the electric oil pump EP and prevent the driver from feeling uncomfortable.

Next, an air bleeding process of the electric oil pump EP after the engine ENG is started will be described with reference to FIG. 3.

Figure 3:
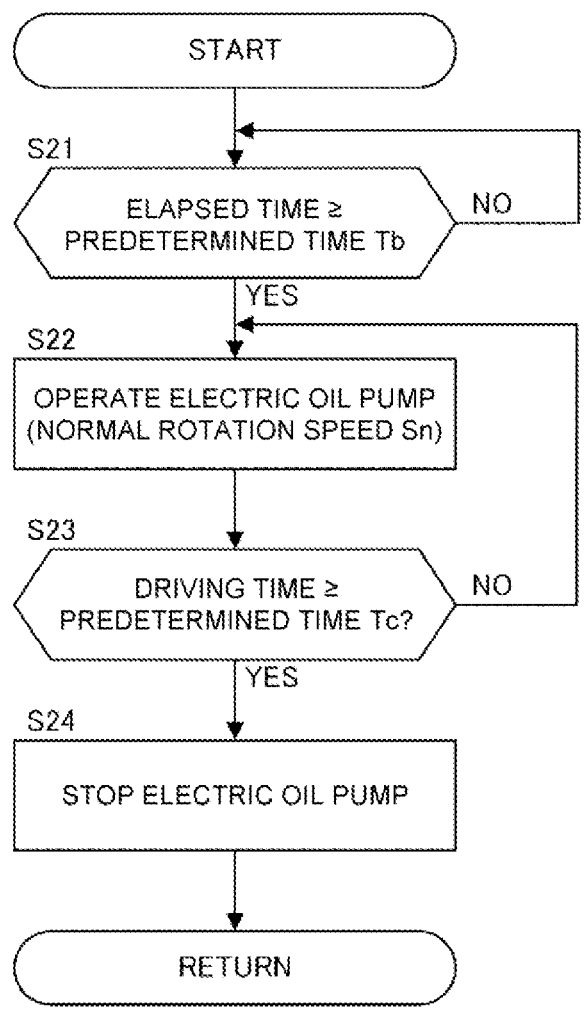
FIG. 3 is a flow chart of an air bleeding process of the second oil pump after the first drive source is started.

FIG. 3 is a flow chart of the air bleeding process of the electric oil pump EP after the engine ENG is started. The flow of FIG. 3 is started continuously after the flow of FIG. 2.

In step S21, the controller 2 determines whether the electric oil pump EP is not driven for the predetermined time Tb, which is the first predetermined time, after the engine ENG is started. The predetermined time Tb is set to the time during which the electric oil pump EP continues to be in a non-driven state and the oil may leak out from the oil passage closer to the electric oil pump EP than the check valve 26. Here, the predetermined time Tb is about 40 [min] to 50 [min]. When the controller 2 determines in step S21 that the electric oil pump EP is not driven for the predetermined time Tb after the the the engine ENG is started, the process proceeds to step S22. On the other hand, when the controller 2 determines in step S21 that the electric oil pump EP is not driven for the predetermined time Tb after the engine ENG is started, the determination of step S21 is repeated.

In step S22, the controller 2 operates the electric oil pump EP at the normal rotation speed Sn.

In step S23, the controller 2 determines whether the electric oil pump EP is driven for the predetermined time Tc, which is a second predetermined time, after starting operating at the normal rotation speed Sn. The predetermined time Tc is set to the time until the number of rotations of the electric oil pump EP reaches the predetermined number of rotations Np. The predetermined number of rotations Np is the number of rotations for filling the oil passage closer to the electric oil pump EP than the check valve 26 with oil. Specifically, the predetermined number of rotations Np is set in advance such that the hydraulic oil is filled in the space above the oil surface in the strainer 33 that suctions up the hydraulic oil from the oil passage 34 upstream of the electric oil pump EP and from the reservoir 40. Here, the predetermined number of rotations Np is about 30 [rotations] to 35 [rotations]. When the controller 2 determines in step S23 that the electric oil pump EP is driven for the predetermined time Tc, the process proceeds to step S24. On the other hand, when the controller 2 determines in step S23 that the electric oil pump EP is not driven for the predetermined time Tc, the determination of step S23 is repeated.

In step S24, the controller 2 stops the operation of the electric oil pump EP. As a result, the air bleeding process of the electric oil pump EP is completed.

As described above, after the engine ENG is started, since the electric oil pump EP is driven for the predetermined time Tc every predetermined time Tb, even when air is mixed in a suction flow path of the electric oil pump EP during traveling, it is possible to bleed the air by operating the electric oil pump EP by the driving of the electric motor M. As a result, when it is necessary to supply the hydraulic pressure from the electric oil pump EP according to a traveling state, it is possible to prevent the influence of mixing of air, and thus it is possible to prevent a decrease in the responsiveness of the transmission TM during traveling due to the influence of air.

Figure 4:
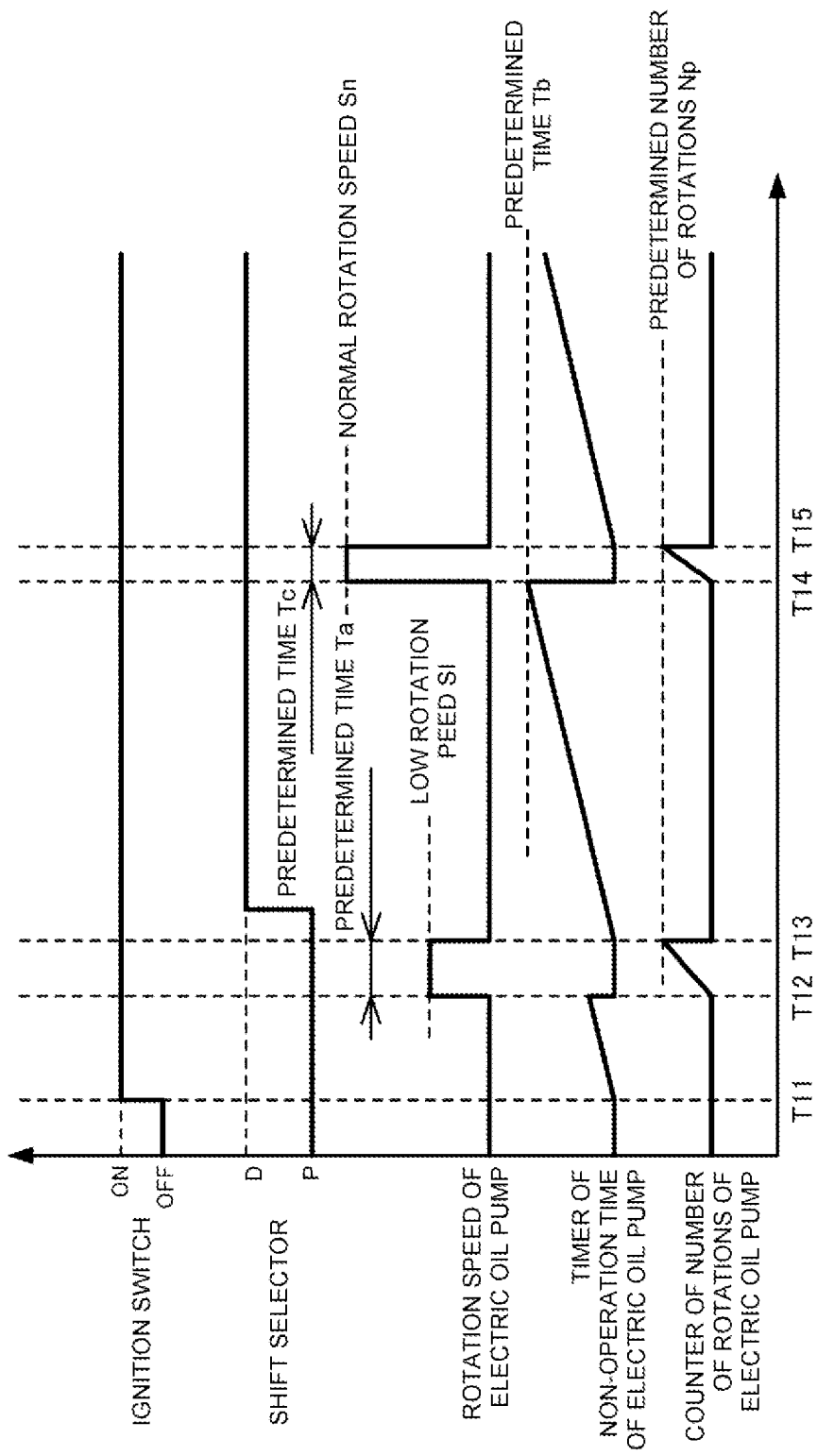
FIG. 4 is a timing chart illustrating a first specific example of the air bleeding process of the second oil pump.

Next, a first specific example of the air bleeding process of the electric oil pump EP performed by the controller 2 will be described with reference to FIG. 4. FIG. 4 is a timing chart illustrating the first specific example of the air bleeding process of the electric oil pump EP.

At time T11, the ignition switch 27 is switched from off to on. At this time, since the operation condition for operating the electric oil pump EP is not satisfied, the controller 2 does not start the operation of the electric oil pump EP.

At time T12, since the operation condition for operating the electric oil pump EP is satisfied, the controller 2 operates the electric oil pump EP at the low rotation speed S1 lower than the normal rotation speed Sn.

At time T13, since the driving time from the start of the operation of the electric oil pump EP at the time T12 reaches the predetermined time Ta, the controller 2 stops the operation of the electric oil pump EP. As a result, the air bleeding process of the electric oil pump EP when the ignition switch 27 is turned on and the engine ENG is started for the first time is completed.

At time T14, since the electric oil pump EP is not driven for the predetermined time Tb after the engine ENG is started, the controller 2 operates the electric oil pump EP at the normal rotation speed Sn.

At time T15, since the driving time from the start of the operation of the electric oil pump EP at the time T14 reaches the predetermined time Tc, the controller 2 stops the operation of the electric oil pump EP. As a result, the air bleeding process of the electric oil pump EP is completed when the electric oil pump EP is not driven for the predetermined time Tb after the engine ENG is started.

Figure 5:
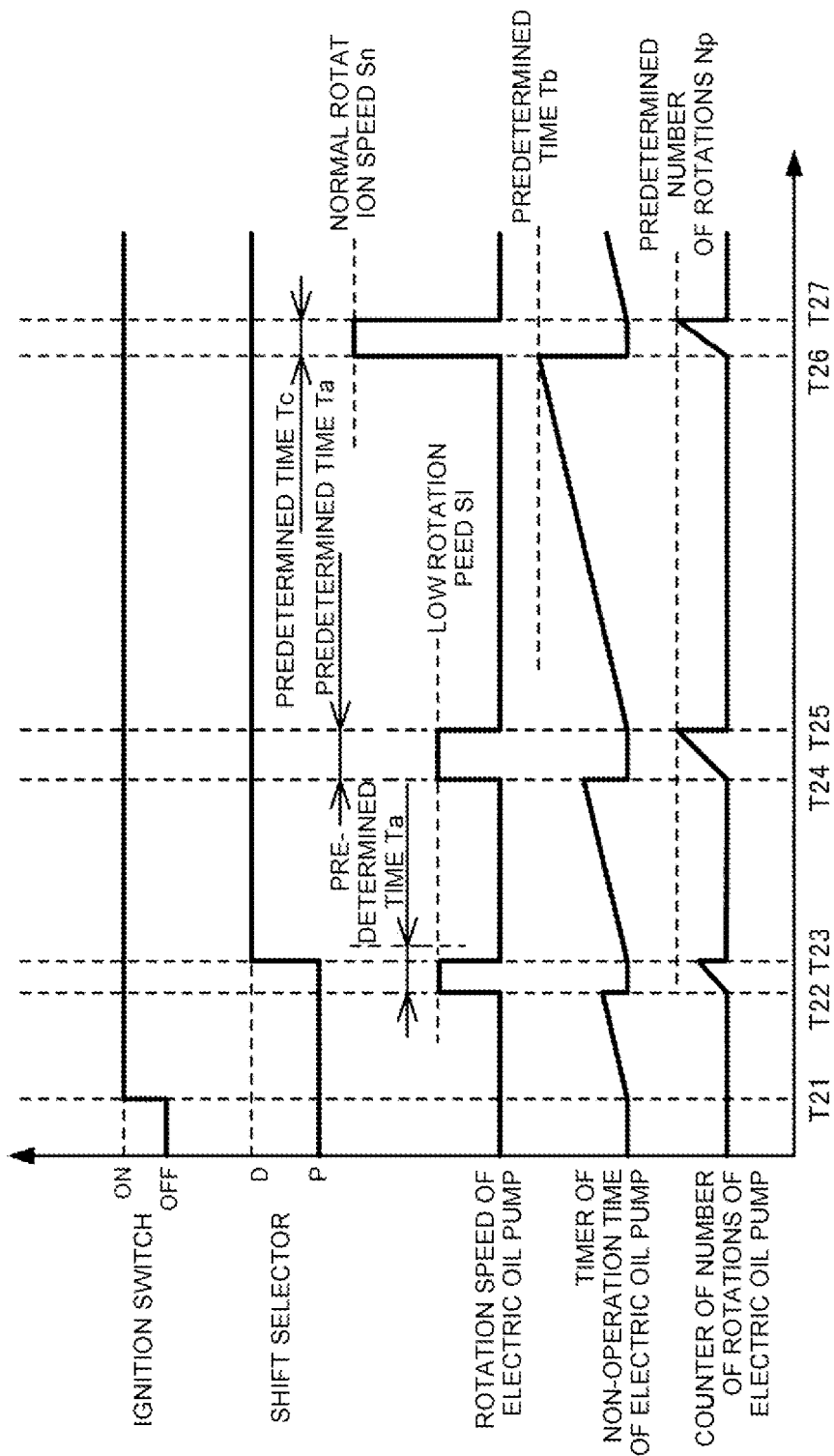
FIG. 5 is a timing chart illustrating a second specific example of the air bleeding process of the second oil pump.

Next, a second specific example of the air bleeding process of the electric oil pump EP performed by the controller 2 will be described with reference to FIG. 5. FIG. 5 is a timing chart illustrating the second specific example of the air bleeding process of the electric oil pump EP. The second specific example is different from the first specific example in that the air bleeding process of the electric oil pump EP when the ignition switch 27 is turned on and the engine ENG is started for the first time is not completed and is executed again.

At time T21, the ignition switch 27 is switched from off to on. At this time, since the operation condition for operating the electric oil pump EP is not satisfied, the controller 2 does not start the operation of the electric oil pump EP.

At time T22, since the operation condition for operating the electric oil pump EP is satisfied, the controller 2 operates the electric oil pump EP at the low rotation speed S1 lower than the normal rotation speed Sn.

At time T23, the shift selector 29 is switched from the P range to the D range which is the traveling range. Therefore, although the driving time of the electric oil pump EP has not reached the predetermined time Ta, the controller 2 stops the electric oil pump EP to stop the air bleeding process.

At time T24, since the operation condition for operating the electric oil pump EP is satisfied again, the controller 2 operates the electric oil pump EP at the low rotation speed S1 lower than the normal rotation speed Sn.

At time T25, since the driving time from the start of the operation of the electric oil pump EP at the time T24 reaches the predetermined time Ta, the controller 2 stops the operation of the electric oil pump EP. As a result, the air bleeding process of the electric oil pump EP when the ignition switch 27 is turned on and the engine ENG is started for the first time is completed.

As described above, in a case where the air bleeding process of the electric oil pump EP when the ignition switch 27 is turned on and the engine ENG is started for the first time is interrupted and is not completed, the air bleeding process of driving the electric oil pump EP at the low rotation speed S1 is repeatedly executed until the air bleeding process is normally completed.

At time T26, since the electric oil pump EP is not driven for the predetermined time Tb after the engine ENG is started, the controller 2 operates the electric oil pump EP at the normal rotation speed Sn.

At time T27, since the driving time from the start of the operation of the electric oil pump EP at the time T26 reaches the predetermined time Tc, the controller 2 stops the operation of the electric oil pump EP. As a result, the air bleeding process of the electric oil pump EP is completed when the electric oil pump EP is not driven for the predetermined time Tb after the engine ENG is started.

The configurations and effects of the present embodiment described above will be collectively described.

(1), (5), (6) In the vehicle 100 including the mechanical oil pump MP that is driven by the engine ENG driving the drive wheels DW of the vehicle 100 and supplies oil to the transmission TM, and the electric oil pump EP that is driven by the electric motor M different from the engine ENG and supplies oil to the transmission TM, the controller 2 drives the electric oil pump EP when the ignition switch 27 of the vehicle 100 is turned on and the engine ENG is started for the first time, and drives the electric oil pump EP when the electric oil pump EP is not driven for a first predetermined time after the engine ENG is started, and a rotation speed (low rotation speed S1) of the electric oil pump EP when the engine ENG is started is lower than a rotation speed (normal rotation speed Sn) of the electric oil pump EP after the engine ENG is started.

According to this configuration, since the electric oil pump EP is driven when the ignition switch 27 of the vehicle 100 is turned on and the engine ENG is started for the first time, it is possible to bleed air out of an oil passage. Since the rotation speed (low rotation speed S1) of the electric oil pump EP when the engine ENG is started is lower than the rotation speed (normal rotation speed Sn) of the electric oil pump EP after the engine ENG is started, a suction sound can be reduced. Therefore, it is possible to suppress the suction sound of the electric oil pump EP and prevent a driver from feeling uncomfortable.

(2) After the engine ENG is started, the controller 2 drives the electric oil pump EP for the predetermined time Tc every predetermined time Tb.

According to this configuration, after the engine ENG is started, since the electric oil pump EP is driven for the predetermined time Tc every predetermined time Tb, even when air is mixed in a suction flow path of the electric oil pump EP during traveling, it is possible to bleed the air by operating the electric oil pump EP by the driving of the electric motor M. As a result, when it is necessary to supply a hydraulic pressure from the electric oil pump EP according to a traveling state, it is possible to prevent the influence of mixing of air, and thus it is possible to prevent a decrease in the responsiveness of the transmission TM during traveling due to the influence of air.

(3) A driving time (predetermined time Ta) of the electric oil pump EP when the engine ENG is started is longer than a driving time (predetermined time Tc) of the electric oil pump EP while the vehicle 100 is traveling.

According to this configuration, since the driving time (predetermined time Ta) of the electric oil pump EP when the engine ENG is started is longer than the driving time (predetermined time Tc) of the electric oil pump EP after the engine ENG is started, it is possible to prevent a decrease in the amount of discharged air even when the rotation speed of the electric oil pump EP at the time of starting is low. Therefore, it is possible to prevent a decrease in the responsiveness of the transmission TM during traveling due to the influence of air.

(4) The rotation speed (low rotation speed S1) of the electric oil pump EP when the engine ENG is started is lower than a minimum rotation speed of the electric oil pump EP after the engine ENG is started.

According to this configuration, since the rotation speed (low rotation speed S1) of the electric oil pump EP when the engine ENG is started is lower than the minimum rotation speed of the electric oil pump EP after the engine ENG is started, the suction sound can be reduced. Therefore, it is possible to suppress the suction sound of the electric oil pump EP and prevent the driver from feeling uncomfortable.

While an embodiment of the invention has been described, the embodiment is merely one of application examples of the invention, and does not intend to limit a technical scope of the invention to a specific configuration according to the embodiment.

For example, in the above embodiment, the case where the check valve 26 is provided closer to a discharge port of the electric oil pump EP has been described. Alternatively, a check valve may be provided closer to a reservoir of the electric oil pump EP. In this case as well, since the oil leaks out from an oil passage between the check valve and the reservoir, a delay may occur in the supply of oil from the electric oil pump EP to the hydraulic pressure control circuit 1. Therefore, in this case, the controller 2 also performs an air bleeding process.

Various programs executed by the controller 2 may be stored in a non-transitory recording medium such as a CD-ROM.

DESCRIPTION OF REFERENCE SIGNS 100 vehicle
2 controller (control device, computer)
27 ignition switch (start switch)
ENG engine (first drive source)
M electric motor (second drive source)
MP mechanical oil pump (first oil pump)
EP electric oil pump (second oil pump)
TM transmission (hydraulic pressure actuation machine)

The present application claims a priority of Japanese Patent Application No. 2021-035860 filed with the Japan Patent Office on Mar. 5, 2021, all the contents of which are hereby incorporated by reference

The invention claimed is:

1. A control device for a vehicle including a first oil pump that is driven by a first drive source driving a drive wheel of a vehicle and configured to supply oil to a hydraulic pressure actuation machine, and a second oil pump that is driven by a second drive source different from the first drive source and configured to supply oil to the hydraulic pressure actuation machine, wherein
the second oil pump is driven when a start switch of the vehicle is turned on and the first drive source is started for the first time, and the second oil pump is driven when the second oil pump is not driven for a first predetermined time after the first drive source is started, and
a rotation speed of the second oil pump when the first drive source is started is lower than a rotation speed of the second oil pump after the first drive source is started.

2. The control device for a vehicle according to claim 1, wherein
after the first drive source is started, the second oil pump is driven for a second predetermined time every first predetermined time.

3. The control device for a vehicle according to claim 1, wherein
a driving time of the second oil pump when the first drive source is started is longer than a driving time of the second oil pump after the first drive source is started.

4. The control device for a vehicle according to claim 1, wherein
the rotation speed of the second oil pump when the first drive source is started is lower than a minimum rotation speed of the second oil pump after the first drive source is started.

5. The control device for a vehicle according to claim 1, wherein
the first drive source is an engine,
the second drive source is an electric motor, and the hydraulic pressure actuation machine is a transmission that is hydraulically actuated.

6. A control method for a vehicle including a first oil pump that is driven by a first drive source driving a drive wheel of a vehicle and configured to supply oil to a hydraulic pressure actuation machine, and a second oil pump that is driven by a second drive source different from the first drive source and configured to supply oil to the hydraulic pressure actuation machine, the control method comprising:
  driving the second oil pump when a start switch of the vehicle is turned on and the first drive source is started for the first time, and driving the second oil pump when the second oil pump is not driven for a first predetermined time after the first drive source is started, wherein
  a rotation speed of the second oil pump when the first drive source is started is lower than a rotation speed of the second oil pump after the first drive source is started.

7. A non-transitory computer-readable medium storing a program executable by a computer of a vehicle including a first oil pump that is driven by a first drive source driving a drive wheel of a vehicle and configured to supply oil to a hydraulic pressure actuation machine, and a second oil pump that is driven by a second drive source different from the first drive source and configured to supply oil to the hydraulic pressure actuation machine, the program comprising:
  causing the computer to execute a procedure of driving the second oil pump when a start switch of the vehicle is turned on and the first drive source is started for the first time, and driving the second oil pump when the second oil pump is not driven for a first predetermined time after the first drive source is started, wherein
  a rotation speed of the second oil pump when the first drive source is started is lower than a rotation speed of the second oil pump after the first drive source is started.

* * * * *